March 10, 1964 R. M. MAGNUSON Re. 25,535
METHOD OF SPRAYING AND DISPENSING LIQUID
Original Filed June 28, 1956 5 Sheets-Sheet 1
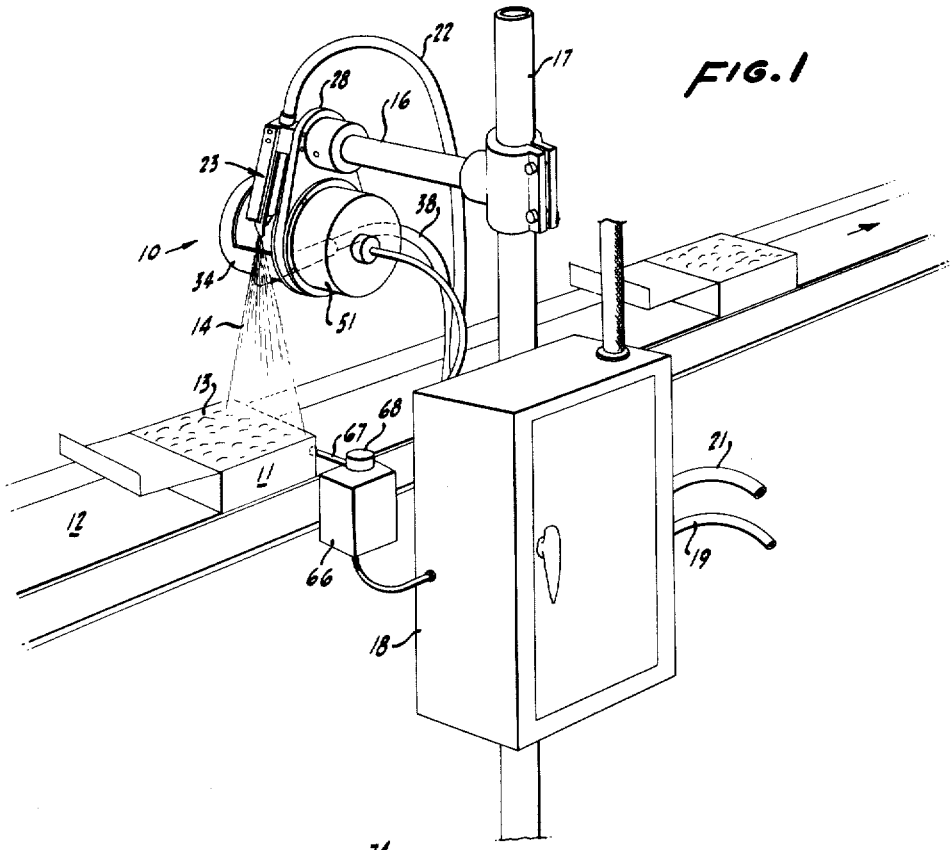
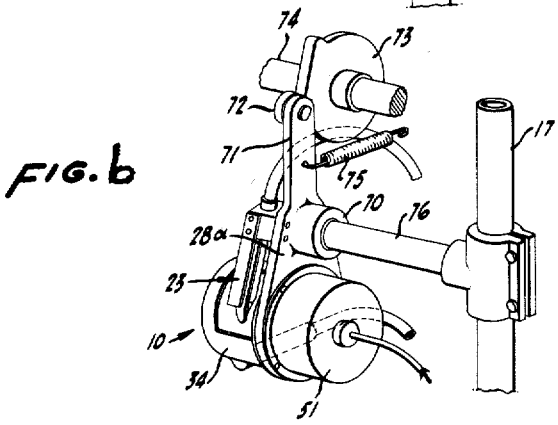
INVENTOR.
ROY M. MAGNUSON
BY
Harper Allen
ATTORNEY METHOD OF SPRAYING AND DISPENSING LIQUID
Original Filed June 28, 1956 5 Sheets-Sheet 2
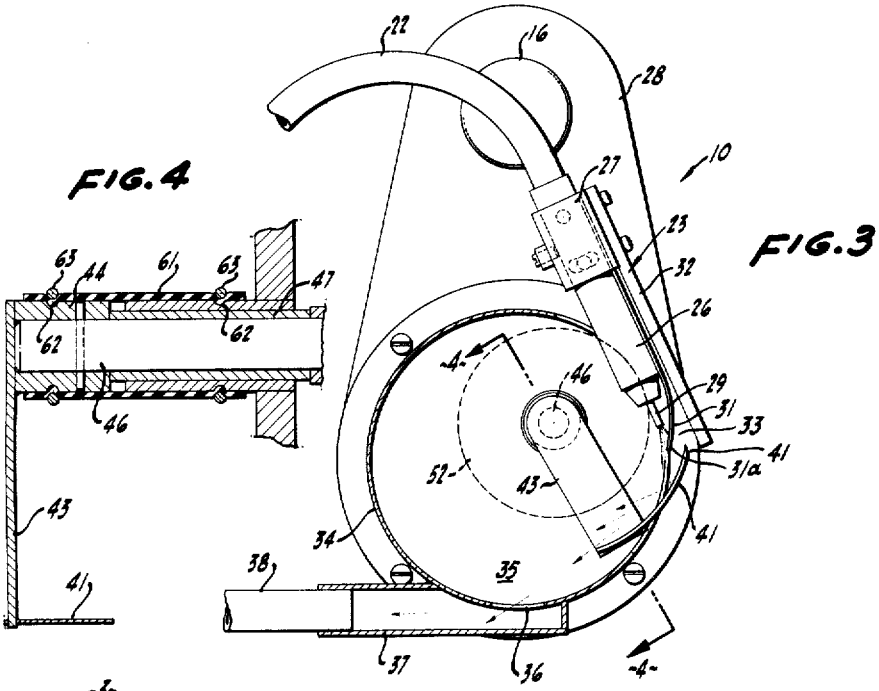
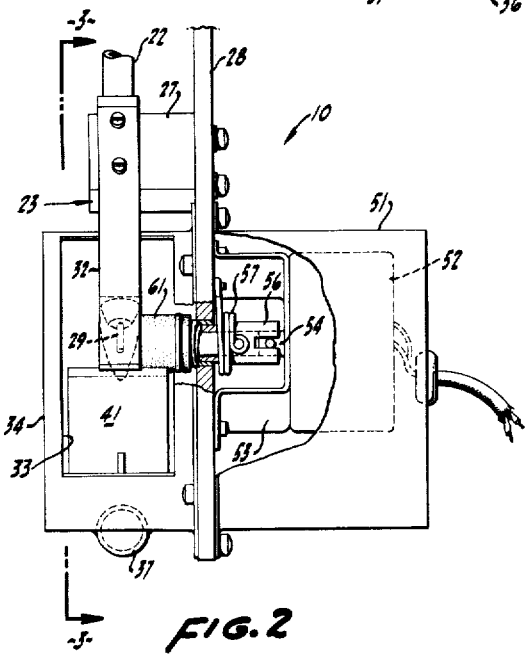
FIG. 2
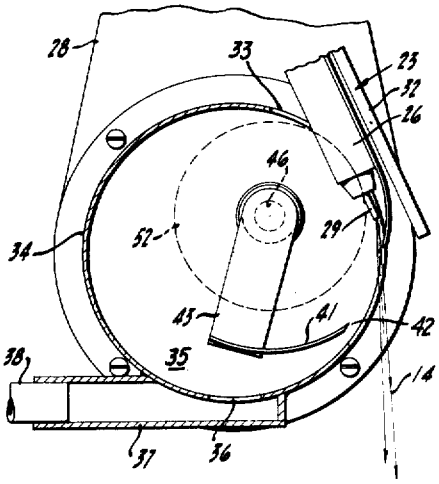
INVENTOR.
ROY M. MAGNUSON
BY Harper Allen
ATTORNEY METHOD OF SPRAYING AND DISPENSING LIQUID
Original Filed June 28, 1956 5 Sheets-Sheet 3
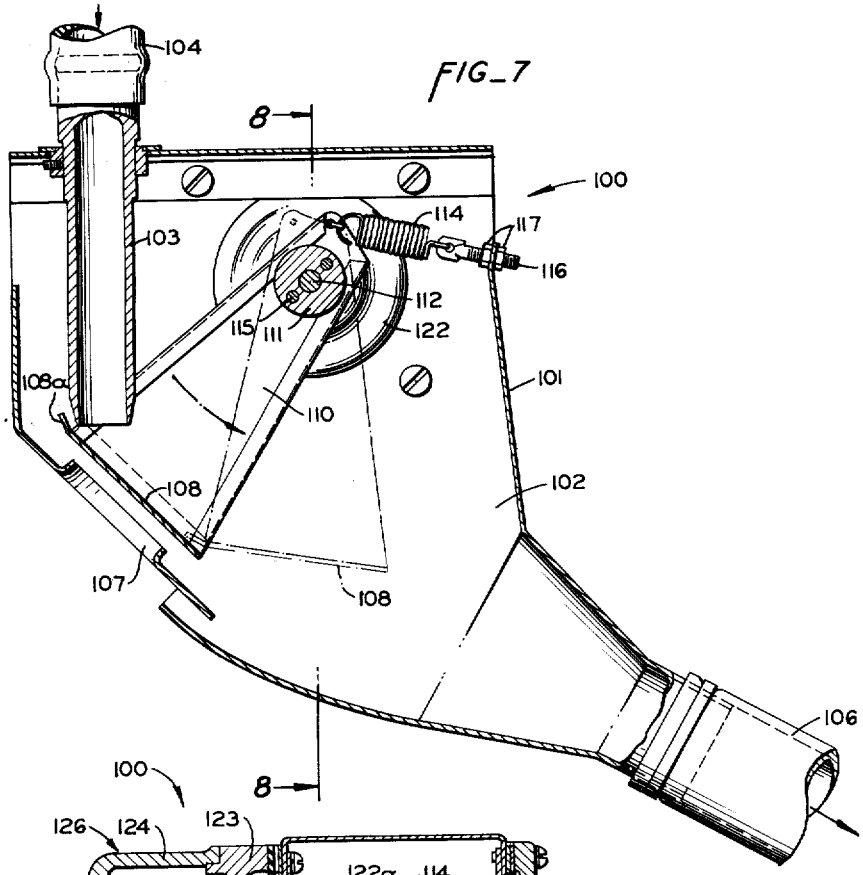
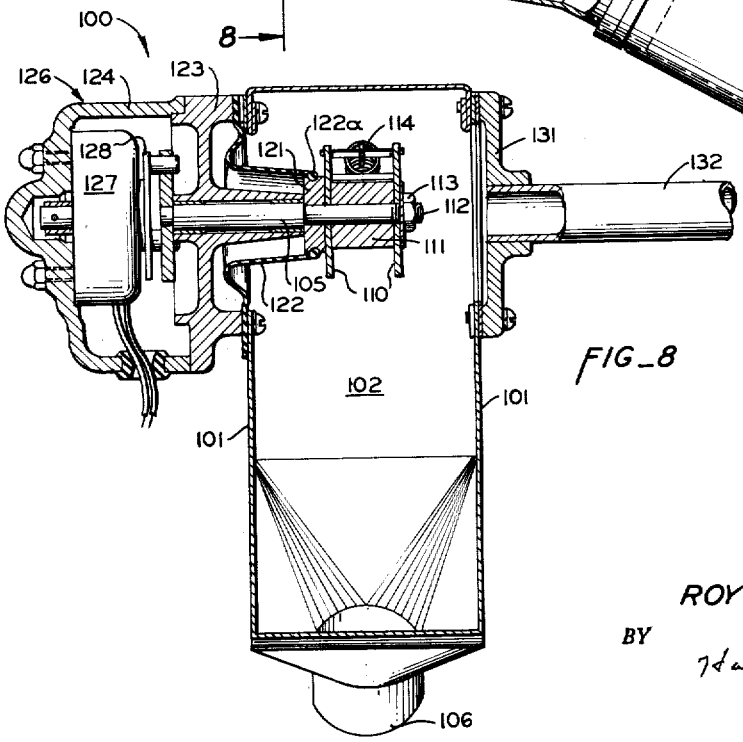
FIG_8
INVENTOR.
ROY M. MAGNUSON
BY
Harper Allen
ATTORNEY

METHOD OF SPRAYING AND DISPENSING LIQUID

Original Filed June 28, 1956 5 Sheets-Sheet 4

INVENTOR.
ROY M. MAGNUSON
BY
Harper Allen
ATTORNEY

METHOD OF SPRAYING AND DISPENSING LIQUID

Original Filed June 28, 1956 5 Sheets-Sheet 5

INVENTOR.
ROY M. MAGNUSON

BY

Hanson Allen

ATTORNEY

United States Patent Office

Re. 25,535
Reissued Mar. 10, 1964

25,535

METHOD OF SPRAYING AND DISPENSING LIQUID

Roy M. Magnuson, deceased, late of Saratoga, Calif., by Morton Salt Company, Chicago, Ill., a corporation of Delaware, assignee Original No. 2,992,928, dated July 18, 1961, Ser. No. 594,651, June 28, 1956. Application for reissue Mar. 29, 1963, Ser. No. 272,819
10 Claims. (Cl. 99—182)

Matter enclosed in heavy brackets [ ] appears in the original patent but forms no part of this reissue specification; matter printed in italics indicates the additions made by reissue.

This application is a continuation-in-part of my copending application, Serial No. 374,173, filed August 14, 1953, and entitled "Method and Apparatus for Spraying Treating Liquid," and now abandoned.

The present invention relates to the dispensing of measured amounts of liquid into a container wherein the liquid is either used for treating a product at a liquid dispensing station with a selected amount of liquid or is used to place a predetermined fill into a container such as a can. The invention is concerned more particularly with an improved method of the above character which is automatic in operation and fast and reliable in use. It is an object of the invention to provide an improved method for dispensing measured quantities of liquid into a package or container.

It is another object of the invention to provide an improved method for spraying a selected amount of treating liquid onto the product, by utilizing a constantly available spray of the liquid and by intermittently releasing the spray onto the product.

It is a further object of the invention to provide improved methods of the above character in which open packages of the products to be treated are carried by a spray station to receive the selected amount of treating liquid.

It is another object of the invention to provide methods of the character described in which the spray is desirably fan-shaped and the intermittent release is effected by substantially drip-proof cut-off mechanism.

Still another object of the invention is to provide methods of the above character by which a relatively minute amount of liquid can be dispensed with accuracy.

A further object of the invention is to provide a method for carrying out a liquid filling operation in which the liquid is circulated as a stream having constant volume and velocity, this stream being passed through an air gap at one portion of its circulating path, and being released while in this air gap for discharge or spraying into a package or container for the desired amount of time to give an accurate fill.

The above and other objects and advantages of the invention will be apparent from the following description of certain preferred methods and apparatus, taken in conjunction with the accompanying drawings, in which:

FIGURE 1 is a schematic perspective view of one form of apparatus for carrying out the invention.

FIGURE 2 is an elevational view, partly in section, of the spray head of the apparatus.

FIGURE 3 is a transverse sectional view of the spray head of the apparatus taken in a plane indicated by the line 3—3 in FIGURE 2.

FIGURE 4 is a fragmentary sectional view through the cut-off plate and its mounting taken as indicated by the line 4—4 in FIGURE 3.

FIGURE 5 is a view similar to FIGURE 3, but showing the spray head in active spraying condition.

FIGURE 6 is a fragmentary perspective view of a modified form of the invention.

FIGURE 7 is a sectional view of a modified form of filling or dispensing head.

FIGURE 8 is a sectional view of the filling head shown in FIGURE 7, being taken in a plane indicated by the line 8—8 in FIGURE 7.

Figure 9:
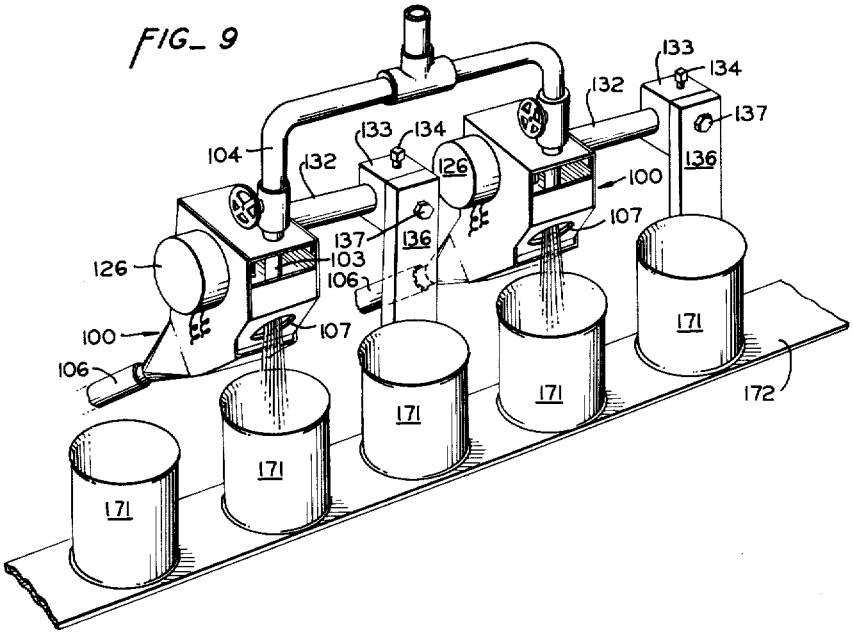
FIGURE 9 is a schematic perspective view illustrating one form of installation employing the filling or dispensing head disclosed herein.

As previously stated, the present invention is concerned with a novel form of liquid measuring apparatus for dispensing purposes in which the liquid is circulated in a substantially closed path providing a stream of constant volume and constant velocity so that by discharging or diverting this stream for a selected period of time, a measurement of a desired amount of liquid can be made accurately. This type of dispensing operation is useful in filling measured amounts of liquids into containers as found, for example, in the canning industry, and is also equally useful in many fields of industry where it is desirable to treat a selected group of products with a liquid treating agent for various purposes. For example, in the food industry, it is desirable to treat certain food products with a flavor accentuating agent as monosodium glutamate, and it is highly desirable that exactly the right amount of liquid be delivered to a package of the product so as to treat the product uniformly without producing excess liquid in the package, and with a minimum loss of the liquid outside the package.

The present method and apparatus is concerned with this treatment of products; for example, in the food industry, and comprises generally a means for circulating liquid under pressure, incorporating a constantly operating spray which is normally by-passed back into the liquid supply. When a package is in position to receive the spray, the by-passing of the spray is interrupted, and a desired amount of liquid is sprayed into the package. The interruption of the by-passing of the liquid so that feeding of liquid occurs may be carried out in response to package control so that irregularly spaced packages may be carried past the spraying station, or it may be carried out in cyclic fashion with evenly spaced packages.

The preferred form of the invention, as illustrated in FIGURE 1 for example, is responsive to the presence of an open package into which a spray is dispensed and includes generally a spray head 10 past which a series of packages 11 are carried by a suitable conveyor 12. The packages 11 are open to expose the product 13 to a divergent or fan-shaped spray 14, which is of a desired width with respect to the width of the package, and the spray 14 is maintained for a period of time with relation to the speed of travel of the package to obtain substantially complete coverage of the product 13 within the package 11. The spray head 10 for example, may be carried on an arm 16 secured on a suitable support post 17. The support post 17 may also carry a suitable housing or cabinet 18 for certain conventional parts, including a motor, a pump and various control elements of the system. A suitable suction line or conduit 19 may extend from the pump to a source of liquid not shown, and a suitable by-pass line 21 may extend from the pump to this source. Incorporated in the by-pass line 21 is a feed line 22 leading to a nozzle structure 23 from which the fan-shaped spray 14 is obtained.

The nozzle structure 23 (FIGURES 2 and 3) comprises a cylindrical body 26 which is secured by a mounting block 27 on a center support plate 28 of the spray head 10, and a projecting tubular nozzle member 29 through which the liquid is ejected. A spray plate 31 is mounted on the block 27 in any convenient manner, with a backing member 32, and has its lower end curved at 31a to intercept the liquid stream from the nozzle 29 and to change its character to a fan-shaped spray which will extend transversely to the direction of travel of the package. The nozzle structure 23 is positioned in a cut-out portion or opening 33 of a cylindrical or cup-shaped housing 34 suitably secured to the side of the plate 28 and forming a liquid collecting chamber 35. The chamber 35 has a bottom opening 36 through which liquid is drained through a tubular attachment 37 to a return line 38 communicating with the by-pass line or conduit 21 for return to the source of liquid.

Means are provided for normally directing the spray from the nozzle structure 23 into the chamber 35, and this means takes the form of an interceptor or cut-off plate 41 having a knife edge 42 at its upper end. The interceptor plate 41 is of arcuate shape and is soldered or otherwise secured to the lower end of an actuating arm 43 having a hub 44 pinned to an actuating shaft 46. The actuating shaft 46 is journaled in a bearing 47 secured in the support plate 28 and extends into a second cup-shaped housing member 51, also secured on the plate 28 in opposed relation to the housing 34. The housing 51 encloses an actuating solenoid 52 of a conventional rotary type carried by a mounting bracket 53. The operating shaft 54 of the armature of the solenoid has a pin and slot connection with a collar 56 pinned to the actuating shaft 46. A torsion spring 57 is connected between the collar 56 and the plate 28 to aid in fast return of the armature.

Within the housing member 34 a seal is provided about the actuating shaft 46 (FIGURE 4) and this seal is in the form of a rubber sleeve 61 engaging over the hub 44 and the bearing 47 of the shaft 46. The hub 44 and the bearing 47 have respective annular grooves 62 into which the rubber sleeve 61 is compressed by suitable spring wire clips 63. In this way the chamber within the housing 34 is sealed against leakage of fluid into the housing 51 containing the rotary solenoid 52.

Operation of the rotary solenoid 52 is controlled by a suitable control switch mounted in a housing 66 attached to the frame of the conveyor 12. A switch arm 67 is positioned to be moved by a package 11 and is pivotally mounted at 68 on the housing 66 so as to operate the switch therein and complete the circuit for the solenoid 52.

Referring to FIGURE 6, a modified form of the invention is shown in which the spray head is mounted for oscillating movement so as to be able to follow the travel of a package therepast. In this modification, the structure is identical with that disclosed in connection with FIGURES 1 through 5, except where differences are described.

Referring to FIGURE 6, the spray head structure includes a center plate 28a having a boss 70 journaled on the post 76. The plate 28a has upwardly projecting cam follower arm 71 carrying a roller 72 engaged with a cam 73 under the influence of a spring 75. The cam 73 is carried by a shaft 74 which may be mounted in a suitable fashion and driven synchronously with the travel of packages along the conveyor 12 so as to oscillate the spray head to follow the package while the spray is being injected into the product, and then to allow immediate return of the spray head to the starting position for cooperation with the next succeeding package. The shaft 74 may be driven from a suitable clutch drive in time with the travel of the packages. If an irregular spacing of the packages will be obtained, the shaft 74 may be driven by a rotary solenoid similar to the solenoid 52 and operated simultaneously therewith by the switch arm 67, as described in connection with the solenoid 52.

In operation the packages of product, such as vegetables for example, are placed on the conveyor 12 and the pumping system for the nozzle structure is set in operation, so that the nozzle structure 23 is constantly delivering a spray which is interrupted by the deflector plate 41 and returned to the chamber 34 and through the conduits 37 and 38 to the source of supply. With the conveyor 12 in operation, a package 11 in spraying position operates the switch arm 67 (FIGURE 1) to close the circuit for the solenoid 52. The solenoid 52 operates in a rapid fashion to move the deflector plate 41 from the position shown in FIGURE 3 to the open position shown in FIGURE 5 when the spray is delivered to the products 13, as illustrated for example in FIGURE 1. When another shape of spray is desirable, the spray plate 31 is omitted. Also, the shape of nozzle 29 may be varied.

During the travel of the package past the spray, the desired amount of liquid for treatment of the product in the package is placed therein in a substantially uniform manner so that all of the product is treated, a suitable timing means being provided for controlling the rotary solenoid. The amount of liquid dispensed can be controlled accurately within relatively minute amounts of liquid, for example, from 0.5 milliliter to 5.0 milliliters. At the end of the spray interval, the deflector plate 41 is returned rapidly to its closed position, or deflecting position, as shown in FIGURE 3 and a sharp cut-off of the liquid spray is obtained.

It will be noted that any drip collecting on the outer surface of the deflector plate 41 will run down the outer surface of this deflector plate and into the housing 34, and any liquid collecting on the inner surface of the deflector plate will run down the inner surface into the housing 34, as shown in FIGURE 3, as the lower end of the deflector plate 41 is disposed inside of the housing 34.

The operation of the form of the invention shown in FIGURE 6 is the same as that described in connection with FIGURES 1 through 5 except that the spray head is moved to travel with a package moving therepast.

As a specific example of the use of the above apparatus, an aqueous solution containing between about 5% and about 35% of dissolved monosodium glutamate, preferably containing about 15% of monosodium glutamate was used as the spraying liquid 14 in processing cut green beans in packages preparatory to quick freezing the product. The frozen product upon thawing and cooking in conventional manner possessed enhanced flavor characteristics as compared with the same product processed in the same way but which had not been treated with monosodium glutamate solution.

Other edible solutions, usually aqueous solutions, containing salt alone (15–35%), containing mixtures of salt (20%) and monosodium glutamate (15%) or containing any other or any further added dissolved substances conventionally added to foods such as fruits, seafood, meats, and vegetables may also be used as the liquid dispensed in the herein described novel apparatus. For example, the fluid dispensing device may be used for the addition of liquid sugar to those fruits to which sugar or sugar syrups are conventionally added preparatory to quick freezing the fruits.

Additionally, the novel dispensing device may be employed for adding these same types of liquids to vegetables and fruits which are being processed by canning techniques instead of by quick freezing techniques. In this instance, however, spray plate 31 having the lower end curved at 31a is reshaped, or readjusted to avoid giving a fan-shaped character to the spray. Instead the width of the ejected liquid stream is adjusted to give a stream no wider than the width or diameter of the container into which the stream is being ejected.

Referring to FIGURES 7, 8, 9 and 10, the modifications of the invention therein shown are adapted to the volumetric filling of containers, or the placing of a measured amount of liquid into containers as referred to above.

Referring particularly to FIGURES 7 and 8, a dispensing head 100 is shown including a sheet metal housing 101 forming a chamber 102 into which liquid is introduced through a pipe or nozzle 103 from a conduit 104, the liquid being discharged freely through the air at the mouth of the pipe 103 to impinge upon and be directed by an interceptor or cut-off plates 108 which directs the liquid to a return conduit 106 for the liquid, in the manner previously described. The housing 101 has an outlet opening 107 which is normally closed by the interceptor or cut-off plate 108, which is similar to the plate 41 previously described.

The interceptor plate 108 is constructed as a part of a U shaped sheet metal part including side portions 110 and which at their upper ends are secured at either side of a spacing sleeve 111 which, together with a washer 121, are secured to the reduced end 112 of a shaft 105 by a nut 113. Suitable pins 115 (FIGURE 7) connect sleeve 111 and the side portions 110 for rotation together. At its upper end the interceptor plate 108 has an inclined lip 108a which leads in the direction of interception of the stream of liquid. A spring 114 tensioned between one of the side portions 110 and a threaded stud 116 adjustably secured in a wall of the housing 101 by lock nuts 117. Also clamped in place with the sleeve 111 as described above is the spacer washer 121 which has a peripheral groove to receive the inner ring-like end 122a of a rubber boot or seal 122 which has its outer peripheral edge clamped between the housing 101, and a mounting casting 123 for a housing 124 for a conventional rotary solenoid 126 suitably mounted in the housing 124. The solenoid 126 has its armature 127 connected to a disc 128 on the oscillating drive shaft 105.

Figure 10:
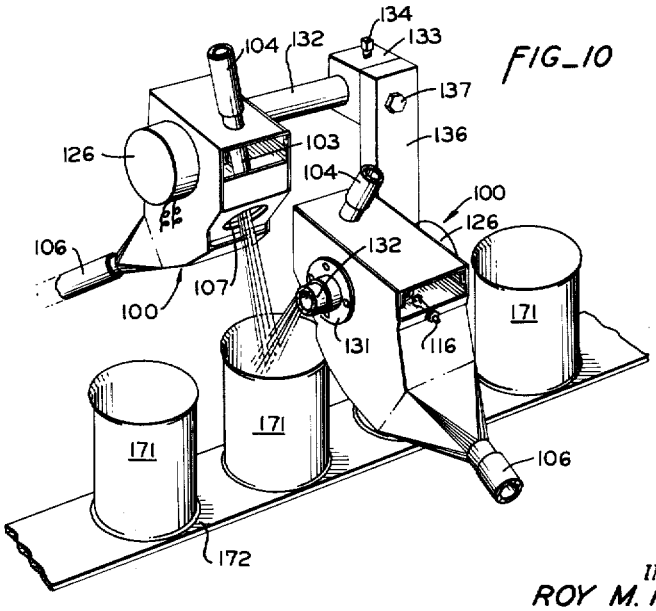
FIGURE 10 is a schematic perspective view illustrating another type of installation.

For mounting the dispensing head 100 and enabling angular adjustment thereof for directing and dispensed or sprayed liquid in a desired manner, the housing 101 has secured thereto a coupling flange 131 (FIGURE 8) in which an end of a pipe 132 may be secured by press fitting. As seen in FIGURES 9 and 10 the pipe 132 is received in an apertured block 133 in which it may be positively located in a desired angular adjustment by a set screw 134, the block 133 being secured on a suitable mounting post 136 by a cap screw 137.

Figure 11:
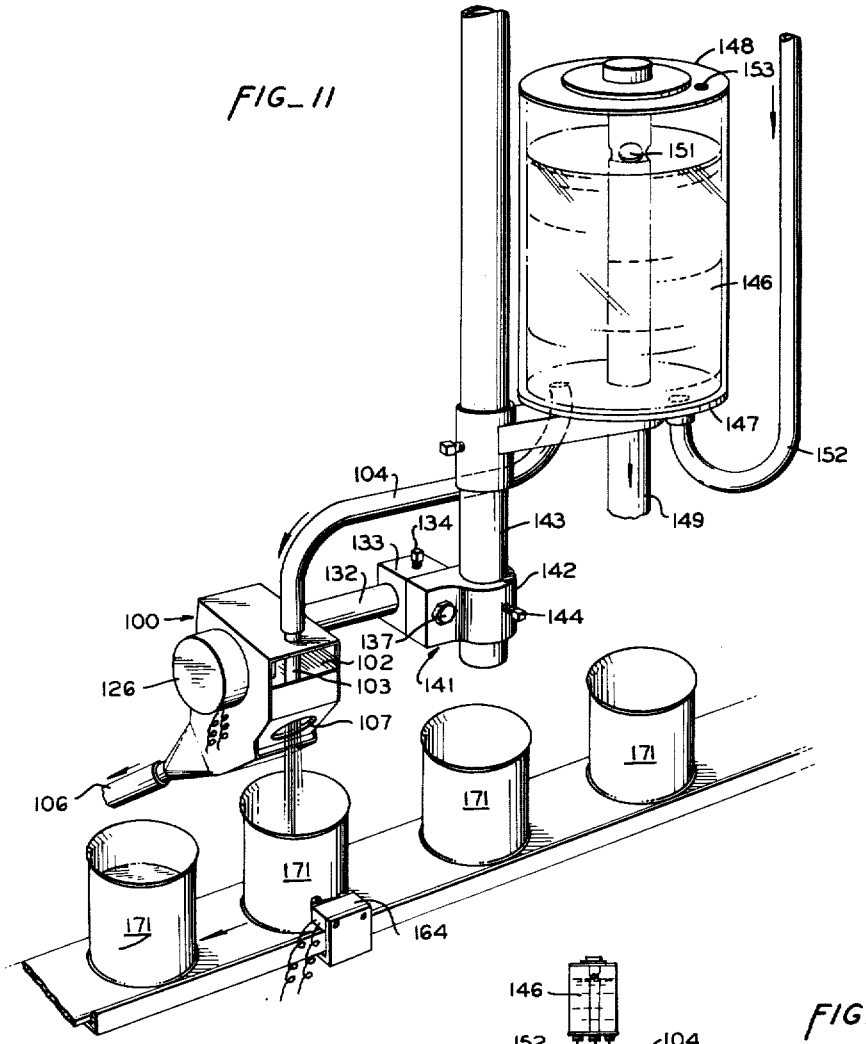
FIGURE 11 illustrates a third method of installing the dispensing head.

Referring to FIGURE 11, the mounting for the dispensing head 100 and its associated pipe 132 and mounting block 133 is by means of a bracket 141 having a sleeve portion 142 adjustably secured on upright pipe 143 by means of a set screw 144. The pipe 143 may be mounted in fixed position in any desired manner.

The liquid supplied through the conduit 104, which in this instance is flexible, is provided by either a constant pressure pump or by a gravity head from a gravity source of supply. In FIGURE 11 the form of the gravity source of supply is of the type described in the co-pending application of J. B. Aldecoa, Serial No. 617,194, filed October 19, 1956, for Filling Apparatus and Method, now Patent 2,951,618. This gravity source of supply is in the form of a transparent container 146 having respective bottom and top plates 147 and 148, to which are suitably secured a bypass discharge pipe 149 having a series of apertures 151 at the desired level of the liquid. The inlet to the container 146 is through a flexible conduit 152 entering the bottom plate 147 through a suitable coupling. The top plate 148 is provided with a breather aperture 153.

Figure 12:
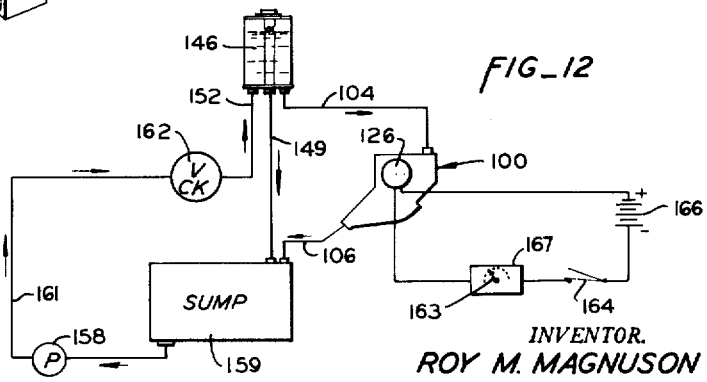
FIGURE 12 is a schematic view illustrating one type of circulating system which can be employed in performing the invention.

The operation of the apparatus in one form is illustrated schematically in FIGURE 12. The system includes a pump 158 having its inlet connected to a sump 159. The outlet from the pump 158 is connected through a conduit 161 and a check valve 162 to the inlet conduit 152 for the gravity container 146. A constant head gravity flow from the container 146 is provided as described through the conduit 104 to the dispensing head 100. The bypass discharge pipe 149 is suitably connected to the sump 159, as is also the bypass return pipe 106 from the head 100.

To control the length of time the discharge gate or interceptor plate 108 is open, the rotary solenoid 126 is electrically connected to a source of potential 166 through a conventional electric timer 167 having an adjusting control 163 for setting the desired time value. A combination starting and no-can no-fill switch 164 (FIGURES 11 and 12) is incorporated in the circuit so that no fill will be made when there is no can present to receive the fill.

One or more of the dispensing heads 100 are provided to place the desired amount of liquid into containers 171 as they pass continually by the dispensing head 100, for example, in FIGURE 9, two dispensing heads 100 are provided, for dispensing measured amounts into the cans 171 carried on a suitable conveyor 172, the timing of the dispensing or filling action being such that separate charges are placed in each container from each of the dispensing heads.

Referring to FIGURE 10, an arrangement is shown where two dispensing heads 100 are placed on opposite sides of the conveyor 172 and discharged simultaneously into a can 171. It will be noted that in FIGURE 10 the angularity of mounting of the heads 100 is different from the angularity necessary in FIGURE 9.

While I have shown and described certain preferred methods of carrying out the invention, and certain preferred apparatus embodying the invention, it will be apparent that both the method and the apparatus are capable of modification and variation from the form shown.

I claim:

1. The method of treating a product within a container with a treating liquid, which comprises carrying the container past a spray station, establishing a constant continuous spray in air of liquid at the spray station from a source of liquid said liquid spray being passed continuously through an air gap at the spray station at a substantially constant volume and at a substantially constant speed while normally collecting and by-passing the liquid spray for a selected time interval back to the source of liquid, and interrupting the collecting and by-passing of the spray during travel of the container past the spray station without changing the substantially constant volume and speed of said liquid spray to spray the product in the container with a selected amount of liquid.

2. The method of treating a product within a container with a treating liquid, which comprises carrying the container in a path past a spray station, establishing a constant continuous spray in air of liquid at the spray station from a source of liquid said liquid spray being passed continuously through an air gap at the spray station at a substantially constant volume and at a substantially constant speed while normally collecting and by-passing the liquid spray back to the source of liquid, interrupting the collecting and by-passing of the spray for a desired time interval during travel of the container past the spray station without changing the substantially constant volume and speed of said liquid spray to spray the product in the container, and moving the spray along said path with the container while spraying the product.

3. The method of dispensing a measured amount of liquid into a container, which comprises placing the container at a dispensing station, establishing a constant continuous flow in air of liquid at the dispensing station from the source of a liquid, said liquid flow being passed continuously through an air gap at the dispensing station at a substantially constant volume and at a substantially constant speed while normally collecting and by-passing the liquid flow back to the source of liquid, and interrupting the collecting and by-passing of said liquid flow for a desired time without changing the substantially constant volume and speed of said liquid flow to place a desired amount of liquid into the container.

4. The method of dispensing a measured amount of edible liquid into a container having a food product therein, which comprises placing the container at a dispensing station, establishing a constant continuous flow in air of liquid at the dispensing station from a source of edible liquid, said liquid flow being passed continuously through an air gap at the dispensing station at a substantially constant volume and at a substantially constant speed while normally collecting and by-passing the liquid flow back to the source of liquid, and interrupting the collecting and by-passing of said liquid flow for a desired time without changing the substantially constant volume and speed of said liquid flow to place a desired amount of liquid into the container, said edible liquid being compatible with the food product in the container.

5. The method of treating a product with a liquid, which comprises continuously and constantly moving liquid along a path, establishing a constant continuous flow in air of the liquid at a part of said path, said liquid flow being passed continuously through an air gap at said part of said path at a substantially constant volume and at a substantially constant speed while normally collecting and by-passing said liquid flow to continue along said path, and interrupting the collecting and by-passing of said liquid flow for a desired time interval without changing the substantially constant volume and speed of said liquid flow to apply a selected amount of liquid to a product disposed outside of said path.

*6. The method of dispensing a measured amount of liquid into containers which comprises moving said containers successively to and from a dispensing station, supplying said liquid to a location adjacent said dispensing station at a substantially constant rate, establishing a continuous flow in air at a substantially constant rate of said liquid supplied to said location, said liquid flow being passed continuously through an air gap at the dispensing station at a substantially constant volume and at a substantially constant speed while normally collecting and by-passing the liquid flow back to the source of liquid, and while a container is at the disepnsing station interrupting the collecting and by-passing of said liquid flow for a desired time without changing the substantially constant volume and speed of said liquid flow and supplying the desired amount of said liquid flowing in air directly into a container at the dispensing station.*

*7. The method of dispensing a measured amount of liquid into containers which comprises moving said containers successively to and from a dispensing station, supplying said liquid to a location adjacent said dispensing station at a substantially constant rate, establishing a continuous flow in air at a substantially constant rate of said liquid supplied to said location, said liquid flow being passed continuously through an air gap at the dispensing station at a substantially constant volume and at a substantially constant speed while normally collecting and by-passing the liquid flow back to the source of liquid, and while a container is at the dispensing station rapidly interrupting the collecting and by-passing of said liquid flow for a desired time without changing the substantially constant volume and speed of said liquid flow and supplying the desired amount of said liquid flowing in air directly into a container at the dispensing station.*

*8. The method of dispensing a measured amount of liquid into containers which comprises moving said containers successively to and from a dispensing station, continuously supplying said liquid to a location adjacent said dispensing station at a substantially constant rate, establishing a continuous flow in air at a substantially constant rate of said liquid supplied to said location, said liquid flow being passed continuously through an air gap at the dispensing station at a substantially constant volume and at a substantially constant speed while normally collecting and by-passing the liquid flow back to the source of liquid, and while a container is at the dispensing station interrupting the collecting and by-passing of said liquid flow for a desired time without changing the substantially constant volume and speed of said liquid flow, and during said time supplying the liquid flow in air directly into a container at the dispensing station to place a desired amount of liquid into the container.*

*9. The method of dispensing a measured amount of liquid into containers which comprises moving said containers successively to and from a dispensing station, supplying to a location adjacent said dispensing station a continuous confined flow of said liquid at a substantially constant speed and volume, establishing a continuous flow in air at a substantially constant rate of said liquid supplied to said location, said liquid flow being passed continuously through an air gap at the dispensing station at a substantially constant volume and at a substantially constant speed while normally collecting and by-passing the liquid flow back to the source of liquid, and while a container is at the dispensing station interrupting the collecting and by-passing of said liquid flow for a desired time without changing the substantially constant volume and speed of said liquid flow, and during said time supplying the liquid flowing in air directly into a container at the dispensing station to place a desired amount of liquid into the container.*

*10. The method of treating with a liquid a product positioned at a dispensing station, which comprises continuously and constantly moving said liquid along a path part of which is adjacent said dispensing station, establishing a constant continuous flow in air of the liquid at the part of said path adjacent said dispensing station, said liquid flow being passed continuously through an air gap at said part of said path at a substantially constant volume and at a substantially constant speed while normally collecting and by-passing said liquid flow to continue along said path, and while a product is at the dispensing station interrupting the collecting and by-passing of said liquid flow and directing said liquid flow through air toward said dispensing station for a desired time interval without changing the substantially constant volume and speed of said liquid flow to apply a selected amount of liquid to a product positioned at said dispensing station.*

References Cited in the file of this patent or the original patent

UNITED STATES PATENTS

| | | |
|---|---|---|
| 192,803 | Wicks | July 3, 1877 |
| 643,102 | Bates | Feb. 13, 1900 |
| 1,082,287 | Schaffer et al. | Dec. 23, 1913 |
| 1,752,890 | Coyte | Apr. 1, 1930 |
| 1,867,601 | Stokes | July 19, 1932 |
| 2,018,538 | Webb | Oct. 22, 1935 |
| 2,026,601 | Young | Jan. 7, 1936 |
| 2,150,479 | Anderson | Mar. 14, 1939 |
| 2,182,378 | Gunn | Dec. 5, 1939 |
| 2,319,476 | Ray | May 18, 1943 |
| 2,324,874 | Peters | July 20, 1943 |
| 2,443,146 | Pyles | June 8, 1948 |
| 2,601,542 | McGihon | June 24, 1952 |
| 2,625,952 | Eide et al. | Jan. 20, 1953 |
| 2,650,003 | Coleman | Aug. 25, 1953 |
| 2,717,106 | Hammer | Sept. 6, 1955 |
| 2,723,200 | Pyenson | Nov. 8, 1955 |
| 2,736,656 | Marshall | Feb. 28, 1956 |

OTHER REFERENCES

"Food Packer," July 1948, page 30.